(12) United States Patent
Ishihara

(10) Patent No.: US 7,894,494 B2
(45) Date of Patent: Feb. 22, 2011

(54) METHOD AND APPARATUS TO CONTROL OUTPUT SPECTRUM BANDWIDTH OF MOPO OR MOPA LASER

(75) Inventor: Toshihiko Ishihara, San Diego, CA (US)

(73) Assignee: Cymer, Inc., San Diego, CA (US)

( * ) Notice: Subject to any disclaimer, the term of this patent is extended or adjusted under 35 U.S.C. 154(b) by 262 days.

(21) Appl. No.: 12/082,254

(22) Filed: Apr. 9, 2008

(65) Prior Publication Data
US 2008/0253408 A1 Oct. 16, 2008

Related U.S. Application Data

(60) Provisional application No. 60/923,486, filed on Apr. 13, 2007.

(51) Int. Cl.
*H01S 3/082* (2006.01)
*H01S 3/1055* (2006.01)
*H01S 3/13* (2006.01)

(52) U.S. Cl. ............ 372/29.011; 372/20; 372/32; 372/55; 372/57; 372/103

(58) Field of Classification Search ........... 372/29.011, 372/32, 55, 103
See application file for complete search history.

(56) References Cited

U.S. PATENT DOCUMENTS 6,393,037 B1    5/2002   Basting et al. ............... 372/20
6,490,306 B2 *  12/2002  Stamm et al. ................ 372/57
7,596,164 B2    9/2009   Fallon et al. ................. 372/57

(Continued)

FOREIGN PATENT DOCUMENTS

| JP | 04-311766  |   | 11/2004 |
| JP | 2004311766 | * | 11/2004 |
| JP | 06-024855  |   | 1/2006  |
| JP | 2006024855 | * | 1/2006  |

OTHER PUBLICATIONS

U.S. Appl. No. 12/082,301, filed Apr. 9, 2008, Partlo.
U.S. Appl. No. 12/082,253, filed Apr. 9, 2008, O'Brien, et al.

(Continued)

*Primary Examiner*—Minsun Harvey
*Assistant Examiner*—Michael Carter
(74) *Attorney, Agent, or Firm*—DiBerardino Law LLC

(57) ABSTRACT

An apparatus and method which may comprise a seed laser defining an optical cavity producing an output. An amplifier may amplify the seed laser output. A bandwidth error signal generator may provide a bandwidth error signal from measured bandwidth and a target. A bandwidth selection element, which may comprise an adjustable sized aperture external to the cavity of the seed laser may selectively alter the bandwidth of the seed laser output. A bandwidth control system may control the bandwidth control element and also selectively adjust a differential firing time between the seed laser and amplifier or another bandwidth selection actuator to cooperated (coarsely or finely) with the bandwidth selection element to control bandwidth of the laser system.

14 Claims, 4 Drawing Sheets

U.S. PATENT DOCUMENTS

2003/0219056 A1* 11/2003 Yager et al. ................... 372/57
2006/0146906 A1* 7/2006 Brown et al. ................... 372/57
2007/0001127 A1 1/2007 Reiley et al. ............. 250/492.2

OTHER PUBLICATIONS

Huggins, et al., "Effects of Laser Bandwidth on OPE in a Modern Lithography Tool", SPIE vol. 6154, pp. 1-12 (2006).

Rafac, "Overcoming Limitations of Etalon Spectrometers Used for Spectral Metrology of DUV Excimer Light Sources", SPIE, vol. 5377, pp. 846-858 (2004).

PCT Search Report dated Jan. 8, 2008, International Patent Application No. PCT/US08/04598 filed Sep. 4, 2008 (7 pages).

\* cited by examiner

METHOD AND APPARATUS TO CONTROL OUTPUT SPECTRUM BANDWIDTH OF MOPO OR MOPA LASER

CROSS-REFERENCE TO RELATED APPLICATIONS

The present application claims priority to Provisional Application Ser. No. 60/923,486, filed on Apr. 13, 2007, entitled TWO STAGE EXCIMER LASER WITH SYSTEM FOR BANDWIDTH CONTROL, hereby incorporated herein by reference. The present application is related to U.S. patent application Ser. No. 12/082,301, entitled LASER LITHOGRAPHY SYSTEM WITH IMPROVED BANDWIDTH CONTROL, filed contemporaneously with the present application and hereby incorporated herein by reference, and is related to U.S. patent application Ser. No. 12/082,253, entitled METHOD AND APPARATUS FOR STABILIZING AND TUNING THE BANDWIDTH OF LASER LIGHT, filed contemporaneously with the present application, hereby incorporated herein by reference.

FIELD OF THE DISCLOSED SUBJECT MATTER

The disclosed subject matter related to active control of bandwidth, such as, in a DUV gas discharge laser system, such as, an excimer or molecular fluorine laser system used, such as, in a line narrowed application, such as, as a laser light source for integrated circuit manufacturing in photolithography.

BACKGROUND

Certain photolithography parameters, such as, the variation of critical dimension ("CD") printed with pitch, otherwise sometimes referred to as Optical Proximity Effect (OPE), such as, in a scanner imaging system, shows a behavior that is characteristic of the imaging and process conditions and is sensitive to variations in those conditions. Maintaining stable process conditions can improve Optical Proximity Correction (OPC) used to offset the effects of OPE. One of the factors which affects the OPE is spectral bandwidth. Passive bandwidth stabilization techniques have been effective in meeting OPE control requirements. However, future tighter OPE specifications, among other things, will require advanced active bandwidth control techniques. Such active control techniques not only improve the stability of $E_{95}$ bandwidth, but also regulate $E_{95}$ bandwidth to a desired setpoint (i.e., within a selected very narrow range).

A variable magnification line-narrowing module is described in U.S. Pat. No. 6,393,037 which issued to Basting et al. on May 21, 2002 ("Basting"), the contents of which are hereby incorporated by reference herein. The abstract of Basting describes a tunable laser including an angular dispersive element and a beam expander including one or two rotatable prisms along with a grating in a line narrowing module to adjust the bandwidth resulting from adjusting the magnification of the beam incident on the dispersive element. The prism beam expanders, when two are used, are disclosed to be mechanically linked to so that the angle of incidence of the beam on the dispersive element is not changed when the magnification changes. This arrangement makes it very difficult, if not impossible, to control center wavelength as well as bandwidth utilizing the rotatable prisms.

Rafac, "Overcoming limitations of etalon spectrometers used for spectral metrology of DUV excimer light sources", Optical Microlithography XVII, Bruce W. Smith, Editor, Proceedings of SPIE, Volume 5377 (2004) pp. 846-858, the disclosure of which is hereby incorporated by reference, discusses methods and apparatus for calculating bandwidth, such as $E_{95}$ bandwidth.

GigaPhoton is believed to advertise a product that performs E95 control using some sort of optical actuation. Japanese Published Patent Application 2006024855, published on Jul. 9, 2004, discloses a variable magnification LNM, also with two rotatable prisms and the use of a differential discharge timing for bandwidth control. Such an arrangement makes it difficult, if not impossible, to control center wavelength and bandwidth with the prisms. Japanese Published Patent Application 2004311766, TWO-STAGE LASER DEVICE FOR EXPOSURE, published on Nov. 4, 2004 discloses a system for bandwidth control that employs a stored record of the spectral quality of portions of the bean exiting a seed laser, at least two distinct portions, and perhaps more, based on pulse repetition rate for the laser system. The bandwidth control system, based on actual operating pulse repetition rate and the stored beam profiles then selects enough portions of the beam with the smallest bandwidth to adequately seed the amplifier portion of the laser system. The selection may be made with what are basically shutters the allow only selected portions of the beam to pass to the amplifier portion of moveable mirrors to change the path between an output aperture on the seed laser and an input aperture on the amplifier portion to pick the portion of the beam entering the amplifier, or a combination of both. This possibly changes with a pulse repetition rate change.

The recent work of Huggins et al., "Effects of laser bandwidth on OPE in a modern lithography tool.", Optical Microlithography XVIII (2006), describes controlling bandwidth to effect photolithographic process variations.

Active bandwidth control as proposed herein using a variable aperture external of the laser resonance cavity and in combination with other bandwidth control actuators has various advantages over the art. The optics within the cavity can be simplified and reduced in number, particularly in a single chamber or in the amplifier of a multiple changer laser system where optical loading is most severe. The variable aperture, in combination with other actuators can be either a coarse or fine adjuster for bandwidth control.

DETAILED DESCRIPTION OF THE DISCLOSED SUBJECT MATTER

State of the art on board metrology, used to accurately measure $E_{95}$, the width of the spectrum integral containing a certain percentage, in this case 95%, of the light intensity of the entire spectrum, i.e., 2.5% of the spectrum intensity is in the upper and lower skirt portions of the spectrum. This has enabled a new array of active control solutions to be deployed. Advanced spectral engineering techniques, including sophisticated control algorithms, according to aspects of an embodiment of the disclosed subject matter are disclosed to be able to be used to stabilize and regulate the bandwidth of the lithography light source while maintaining other key performance specifications.

Figure 1:
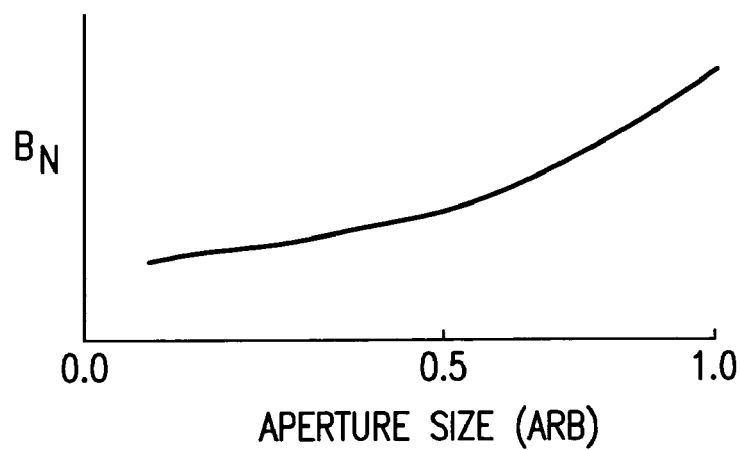
FIG. 1 shows a bandwidth control device $E_{95}$ sensitivity curve according to aspects of an embodiment of the disclosed subject matter.

A measured E95 signal may be used to determine an adjustment to a bandwidth control device ("BCD") position as is known in the art, such as, to stay on the right hand or left hand side of the BCD curve or at the minimum of the BCD curve. Such a curve is illustrated in FIG. 1.

Figure 2:
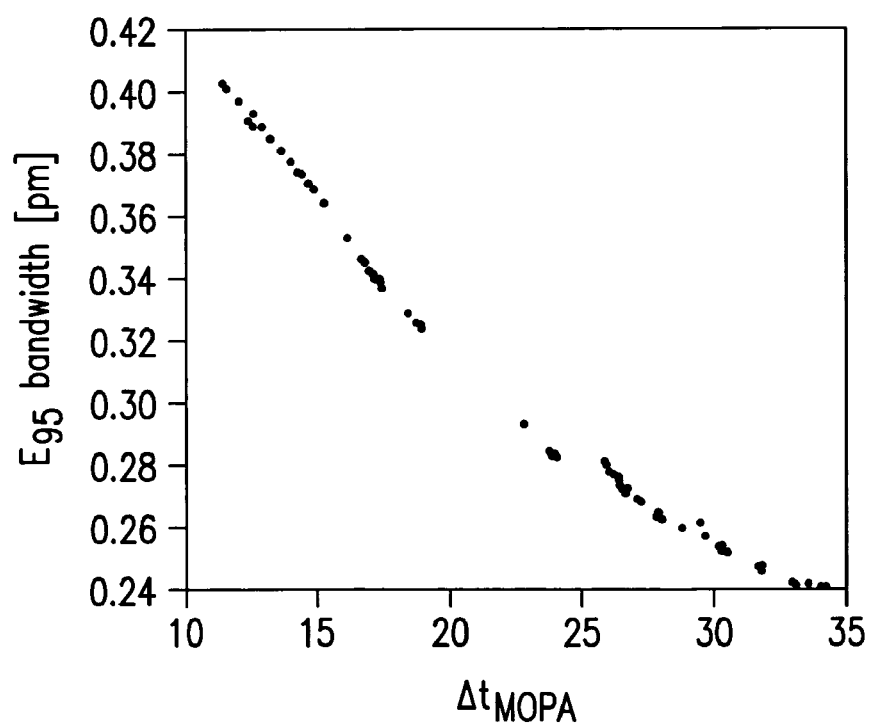
FIG. 2 shows a curve illustrating the effect on bandwidth of changing differential firing time between a seed laser and amplifier laser according to aspects of an embodiment of the disclosed subject matter.

In dual chamber lasers, such as, in a master oscillator/power amplifier MOPA configuration or master oscillator/power oscillator MOPO configuration, bandwidth, such as, E95 bandwidth, may be seen to be sensitive to the relative time delay, denoted ΔtMOPA, perhaps more so in a MOPA configuration than in certain types of MOPO configurations, between the commutation of the MO and PA/PO pulse power. The MO output pulse becomes more line-narrowed over its formation duration with more round trips through the line narrowing module ("LNM"). As the PA chamber is fired later relative to the MO chamber lasing, it selects a more line-narrowed portion of the MO pulse. The effective E95 bandwidth of the output of the entire laser system decreases, as illustrated in FIG. 2., for a typical MOPA configuration. The parameter dtMOPA (ΔtMOPA) can thus be a bandwidth control authority. the shorthand notation dtMOPA and/or ΔtMOPA, or differential firing timing is used herein as a shorthand for any differential timing control of the firing of the discharges in the seed laser, such as the MO, and the amplifier laser, such as the PA or PO, or other amplifier laser configuration, and is not limited to a specific configuration such as a MOPA configuration.

The use of differential firing time as either a coarse or a fine actuator to control $E_{95}$ bandwidth has a number of advantages. The measurement of $E_{95}$ and the change of $\Delta t_{MOPA}$ both can occur on about a tens-of-pulses time scale, or shorter, such as, pulse-to-pulse, allowing for very high frequency disturbance rejection, i.e., disturbances can be suppressed very quickly. The available range of actuation can be seen to be large enough to attenuate/suppress the sources of bandwidth deviation being targeted, namely, by way of example, laser energy, the higher frequency effects of duty cycle variations and/or pulse repetition rate changes.

Figure 3:
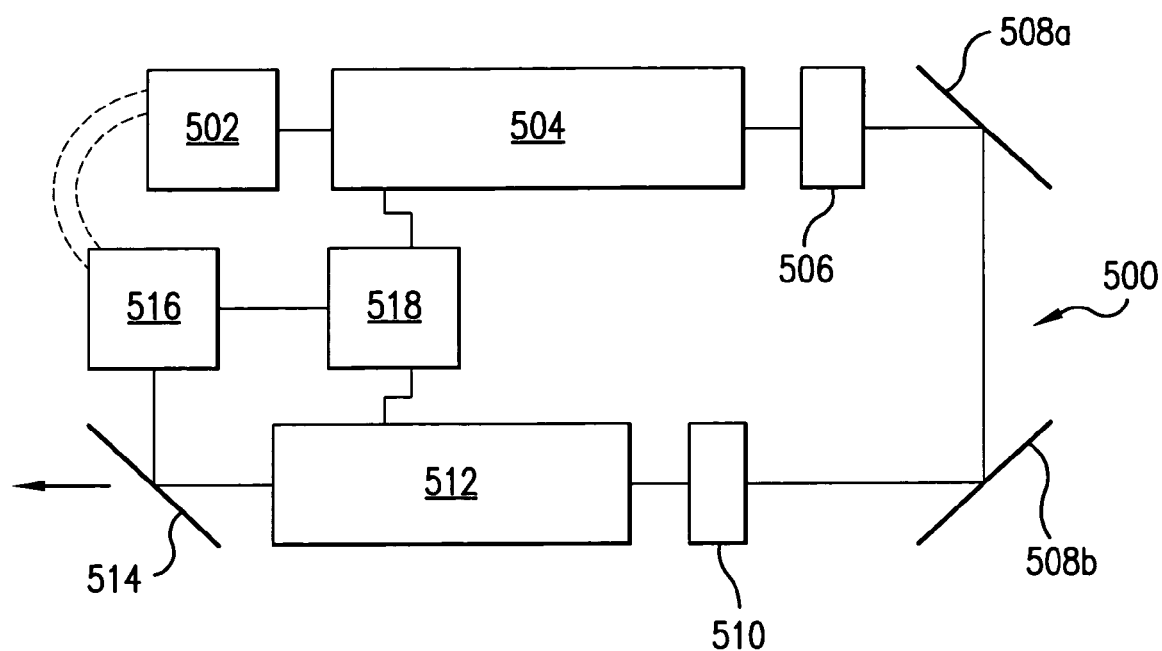
FIG. 3 shows schematically and in block diagram form a multi-stage gas discharge laser system having a variable magnification line narrowing module and differential firing time (dtMOPA) bandwidth control according to aspects of an embodiment of the disclosed subject matter.

FIG. 3 shows schematically and in block diagram format, a multi-stage gas discharge laser 500 having variable magnification line narrowing module 502 and a differential firing time (dtMOPA) bandwidth controller 518. The first stage 504 may be a master oscillator, MO. Subsequent stage(s) 512 may be, for example, a single-pass power amplifier, a multi-pass power amplifier, a power oscillator or a traveling wave amplifier such as a power ring amplifier, in which oscillation occurs in a resonance cavity. A multi-stage device may include some or all of the components shown in FIG. 3, depending on the configuration. The components shown in FIG. 3 include a variable magnification line-narrowing module 502, first stage chamber 504, first stage output coupler 506, turning optics 508a,b, input coupler 510, second stage chamber 512 and beam splitter 514, bandwidth measurement module 516 and discharge timing control module 518.

Figure 4:
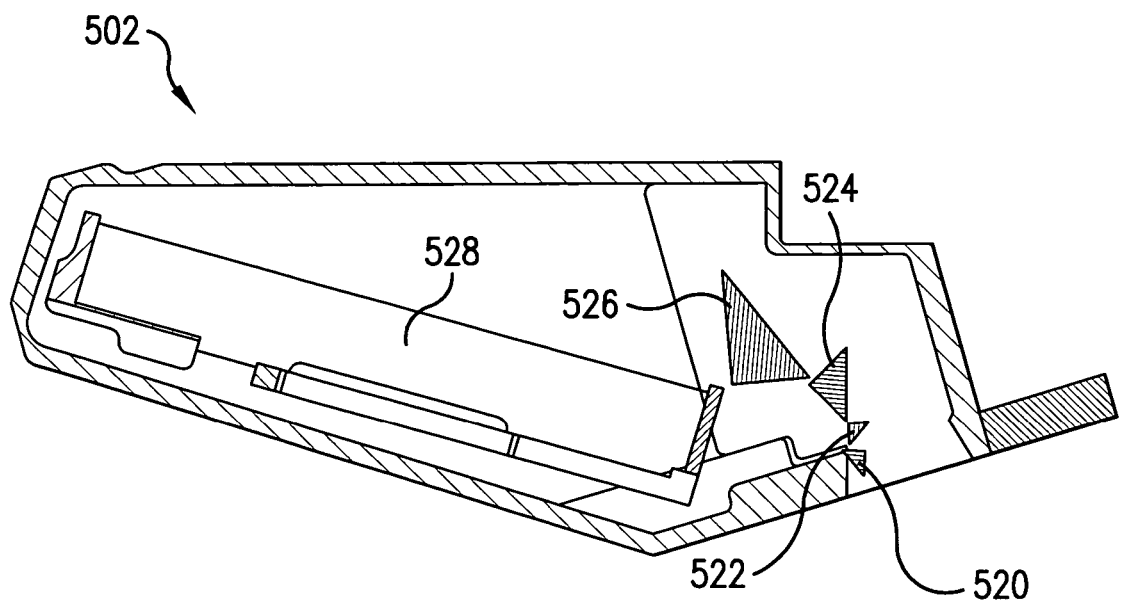
FIG. 4 shows partly schematically an embodiment having four prisms and a grating, wherein at least one prism can be rotated to increase/decrease beam width incident on the grating and thereby alter bandwidth.

For the laser system 500, the variable magnification line-narrowing module 502 may be configured as one of the embodiments described in the above referenced the Basting patent referenced above. FIG. 4 shows a possible specific embodiment having four prisms 520, 522, 524, 526 and a grating 528. Prism 520 may be mounted on a rotational motion mounting, e.g., a flexured mounting (not shown) so that the prism 520 may be rotatable via a rotational position actuator, such as stepper motor (not shown) and/or a PZT stack (not shown) to form a bandwidth or center wavelength selection actuator, i.e., to increase/decrease beam width and thereby alter bandwidth (coarsely), such as E95, FWHM, etc., or to act to select the angle of incidence of the beam on the grating to act as a center wavelength selection actuator (alone, or coarse or fine). Prism 522 may be left stationary, or could also be rotatable to act as one of a coarse or fine bandwidth or center wavelength selection actuator. Prism 524 may also be rotatable, such as with a mounting (not shown) that is rotatable via an actuator(s) (not shown), such as stepper motor and/or a PZT stack to adjust center wavelength or bandwidth (coarsely or finely). By coarse and fine adjustment, it will be understood that, as an example, coarsely adjusting bandwidth at the bandwidths required for such applications as integrated circuit manufacturing photolithography, means generally in a range of about 200 fm-500 fm and fine adjustment is generally speaking in a range of around ±50 fm. Simply speaking the coarse adjuster is a less precise and/or detailed adjustment of the parameter (such as bandwidth or center wavelength) in the vicinity of the desired parameter target and the fine adjustment is a finer tuning to the target value itself, and generally speaking the one tuning actuator (coarse actuator) takes larger and less precise actuation steps (in terms of closing to the target) and the other smaller and more precise actuation steps to actually close to the target.

Prism 524 may also be mounted for rotational movement, such as on a mounting (not shown) that is rotatable via actuator (not shown), such as stepper motor and/or PZT to act as a center wavelength selection actuator or a bandwidth selection actuator (coarse or fine). In a preferred embodiment from among the many possible variations just discussed, prism 520 may be rotatable for bandwidth (beam expansion) control, prism 522 left stationary for beam alignment purposes and prisms 524 and 526 made rotatable for center wavelength (angle of incidence on the grating) selection (respectively fine and coarse).

According to aspects of an embodiment of the disclosed subject matter a method may be used to control the spectrum profile (bandwidth) of a seed laser amplifier laser arrangement, such as a MOPA or MOPO laser system, which may be more suitable for a MOPO laser because it may reduce the MO energy input to the second (amplifier) stage 512. This method may not rely on the dtMOPA timing control, utilization of which may have an undesirable side effect on one or more other laser system operating parameter, such as, energy stability, though dtMOPA timing control may be utilized to augment the apparatus and method described here. The apparatus and method may be used to provide both symmetrical and asymmetrical control of a laser output spectrum.

The output spectrum of the laser that uses a prism and/or folding mirror and grating-based spectral narrowing method can have a spatial non-uniformity of wavelength, by way of example, In the direction normal to the saw tooth structure of the grating. By selecting a part of the laser beam from the master oscillator by means of, by way of example, an adjustable aperture, such as 58 in FIG. 6 or 610 in FIG. 7, or such as that shown in the co-pending patent application Ser. No. 11/173,988, entitled ACTIVE BANDWIDTH CONTROL FOR A TUNED LASER, filed on Jun. 30, 2005, incorporated herein by reference, from which FIG. 6 was taken, and injecting that partial beam into the power amplifier or power oscillator, such as amplifier 512 illustrated schematically in FIG. 3, the system output spectrum bandwidth can be controlled. The power amplifier or power oscillator such as 512 in FIG. 3, that is used as the second stage (amplifier) can require a certain input beam size, which can be provided by a combination of two lens or similar means such as a beam expander (using prisms for example) or another adjustable aperture to size and shape the beam, such as, expand and collimate the beam, after it is apertured to select a desired portion for purposes of adjusting or selecting bandwidth. As an example an adjustable beam expander collimator 600 illustrated schematically in FIG. 7 could be used.

Figure 7:
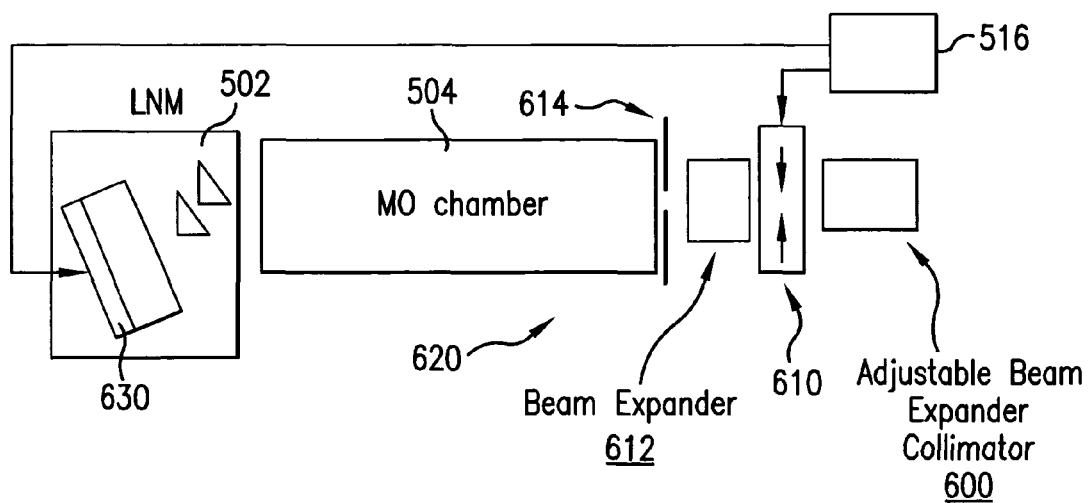

A bandwidth monitor such as in a bandwidth analysis module ("BAM"), 516 in FIG. 3, can provide a feedback signal to a bandwidth controller such as 620 in FIG. 7, that may utilize the bandwidth signal to adjust the portion of the beam that is passed through the adjustable aperture 610, such as where the beam selecting aperture size and beam shaping are both controlled to select both bandwidth and beam size into the amplification stage of the laser system, so as to provide both symmetrical and asymmetrical controls of spectrum shape (bandwidth), which may be done by way of example in the adjustable beam expander/collimator 600. It will be understood that bandwidth of the seed laser beam, such as the MO beam, before the adjustable aperture should be large enough to provide a desired range of spectrum bandwidth after adjustable aperture.

If desired, according to the present disclosed subject matter, dtMOPA timing may be left alone to allow the MOPA laser to operate at its optimum dtMOPA timing, for the benefit of other laser operating parameters apart from bandwidth, such as pulse energy, dose stability and the like, while the adjustable aperture 610, or other form of active bandwidth control, may be utilized in combination with one or more other bandwidth control actuators, either as the coarse or fine adjuster or with relatively equal speed of adjustment, as a bandwidth selection actuator (control authority) to select bandwidth. Alternatively, the dtMOPA bandwidth selection actuator may be only used for fine adjustment and thus not be required to deviate significantly from optimum dtMOPA from other operational standpoints such as pulse energy stability, dose stability or the like.

Since energy stability of a seed laser amplifier laser such as a MOPA or MOPO can be strongly affected by the MO energy input to PA/PO, it may be desired to have separate voltage controls for MO and PA/PO to adjust and control MO energy output independent of the amplifier portion, such as the PA/PO.

Figure 6:
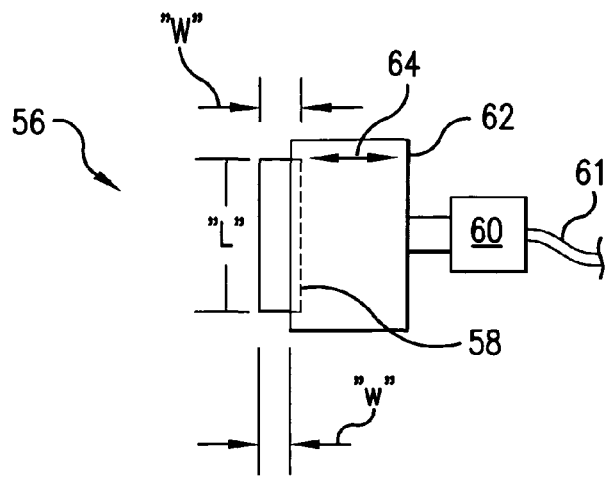
FIG. 6 illustrates partly schematically a variable aperture bandwidth control mechanism according to aspects of an embodiment of the disclosed subject matter; and, FIG. 7 illustrates schematically an arrangement according to aspects of an embodiment of the disclosed subject matter.

An adjustable aperture could be rectangular so as to adjust in the short axis of the beam, which in applicants' assignee's laser systems, such as Cymer's 7XXX series or XLA or LXLR series laser systems, is ordinarily an adjustment of size in the horizontal direction, in the case of a line-narrowed laser, as shown for example in FIG. 6. The beam can be expanded before the adjustable aperture to improve controllability, such as with a beam expander 612, a prism or a plurality of prisms, or a lens of lens combination, the like. After a part of the beam is selected by the adjustable aperture, it could, as noted above, be expanded/contracted and colli-mated to meet the beam size requirement of PA or PO, such as in the adjustable beam expander collimator, which could be, by way of example an telescope or an adjustable telescope with a separate collimating lens. Beam expansion may not be needed for a MOPO arrangement where beam sixe in the region of the amplifier electrodes during electric discharge between the electrodes may not be as important as in a fixed pass(es) amplifier. The beam shaping optics could also be, by way of example, a combination of cylindrical lenses that can have the distance between two adjusted. For symmetrical spectrum control, the center of an adjustable aperture could be aligned to the center of the beam. For asymmetrical spectrum control, the center of adjustable aperture could be moved in one axis, such as in the horizontal direction toward one edge or the other of the beam to, for example, increase or decrease bandwidth.

For some disturbances to a laser operating parameter such as relating to beam quality, such as bandwidth, the variation may be more pronounced in the vertical direction of the beam. This can be true as an example for repetition rate dependent disturbances. therefore, the variable aperture illustrated in FIG. 6 may be rotated 90° in the plane of the page as illustrated and select a vertically oriented portion of the beam for beam quality parameter selection, like bandwidth selection. this may also be done in tandem with a selection aperture as in FIG. 6 and another such aperture as just described.

For some applications, the variable magnification line-narrowing module 502 may be responsive to signals generated by the bandwidth measurement module 516. The variable magnification line-narrowing module 502 may be used for coarse bandwidth control with one or both of the bandwidth control rotatable prisms 520, 522, 524 and/or 526 and another bandwidth control actuator, such as differential firing time (dtMOPA), or grating bending, such as with a bandwidth control device ("BCD") grating deformer, shown schematically at 630 in FIG. 7, or a variable aperture, within or outside the cavity, may be used for fine bandwidth control. Each of these bandwidth selection actuators can be used in combination with anyone or more of the others as one or the other of a coarse control actuator and a fine control actuator.

Figure 5:
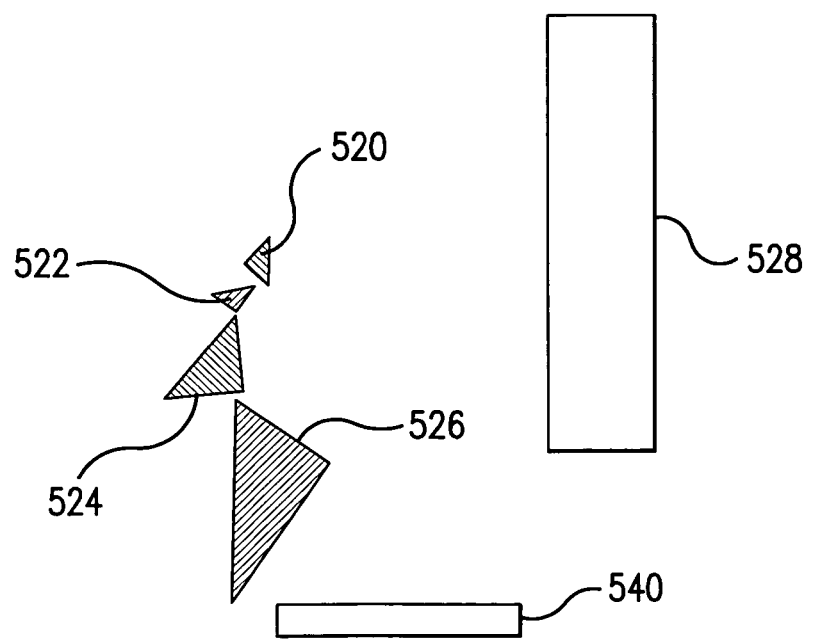
FIG. 5 illustrates schematically an arrangement according to aspects of an embodiment of the disclosed subject matter.

FIG. 5 illustrates schematically a configuration utilizing both a prism for center wavelength selection (coarse or fine) and a folding $R_{MAX}$ mirror for center wavelength selection (coarse or fine). In either case, as an example, the coars actuator (prism or $R_{MAX}$ could be position actuated by a slower less precise positioning actuator (from a center wavelength selection point of view), such as a stepper motor and the fine center wavelength selection actuator (prism or $R_{MAX}$) could be position actuated by a faster and more positionally precise position actuator, such as a PZT stack.

It will be understood by those skilled in the art that aspects of embodiments of the subject matter disclosed above are intended to satisfy the requirement of disclosing at least one enabling embodiment of the subject matter of each claim and to be one or more such exemplary embodiments only and to not to limit the scope of any of the claims in any way and particularly not to a specific disclosed embodiment alone. Many changes and modification can be made to the disclosed aspects of embodiments of the disclosed subject matter of the claims that will be understood and appreciated by those skilled in the art, particularly in regard to interpretation of the claims for purposes of the doctrine of equivalents. The appended claims are intended in scope and meaning to cover not only the disclosed aspects of embodiments of the claimed subject matter but also such equivalents and other modifications and changes that would be apparent to those skilled in the art. In additions to changes and modifications to the disclosed and claimed aspects of the subject matter disclosed of the present invention(s) noted above, others could be implemented.

I claim:

1. A laser system comprising:
   a laser light source comprising:
   a seed laser defining an optical cavity producing a seed output beam;
   an amplifier laser;
   a bandwidth metrology module measuring the bandwidth of a laser output light pulse beam pulse produced by the light source and providing a bandwidth measurement;
   a bandwidth error signal generator receiving the bandwidth measurement and a bandwidth set-point and providing a bandwidth error signal;
   an adjustable aperture external to the cavity of the seed laser and responsive to the bandwidth measurement, which selects a spatial portion of the seed output beam, to selectively alter the bandwidth of the seed laser output, and which injects the spatial portion into the amplifier laser where it is amplified; and
   a beam expansion system expanding the size of the seed output beam incident on the adjustable aperture.

2. The laser system of claim 1 further comprising:
   a bandwidth selection actuator acting in cooperation with the adjustable aperture to select a bandwidth of the laser system.

3. The laser system of claim 2 wherein:
   the bandwidth selection actuator comprises a differential firing timing system, that adjusts a differential firing time between the seed laser and amplifier laser.

4. The laser system of claim 3 wherein:
   the adjustable aperture comprises a coarse bandwidth control actuator and the differential firing timing system comprises a fine bandwidth control actuator.

5. The laser system of claim 1 wherein:
   the adjustable aperture comprises a coarse bandwidth control actuator and the beam expansion system comprises a fine bandwidth control actuator.

6. The laser system of claim 1 wherein:
   the adjustable aperture comprises a fine bandwidth control actuator and the beam expansion system comprises a coarse bandwidth control actuator.

7. The laser system of claim 1 further comprising:
   a bandwidth control device configured to modify the shape of the seed output beam prior to incidence on the adjustable aperture.

8. The laser system of claim 7 wherein:
   the adjustable aperture comprises a coarse bandwidth control actuator and the bandwidth control device comprises a fine bandwidth control actuator.

9. The laser system of claim 7 wherein:
   the adjustable aperture comprises a fine bandwidth control actuator and the bandwidth control device comprises a coarse bandwidth control actuator.

10. The laser system of claim 1 further comprising:
    a beam expander intermediate the adjustable aperture and the amplifier laser, wherein the beam expander is configured to adjust the size of the beam spatial portion entering the amplifier laser.

11. The laser system of claim 2 further comprising:
    a beam expander intermediate the adjustable aperture and the amplifier laser, wherein the beam expander is configured to adjust the size of the beam spatial portion entering the amplifier.

12. The laser system of claim 10 further comprising:
    a beam collimator intermediate the adjustable aperture and the amplifier laser, wherein the beam collimator is configured to collimate the beam spatial portion entering the amplifier laser.

13. The laser system of claim 11 further comprising:
    a beam collimator intermediate the adjustable aperture and the amplifier laser, wherein the beam collimator is configured to collimate the beam spatial portion entering the amplifier laser.

14. The laser system of claim 12 wherein:
    the beam expander and the beam collimator are a part of a beam size adjustment collimator.

* * * * *